United States Patent [19]

Marling

[11] 4,287,037
[45] Sep. 1, 1981

[54] DEUTERIUM ENRICHMENT BY SELECTIVE PHOTO-INDUCED DISSOCIATION OF AN ORGANIC CARBONYL COMPOUND

[75] Inventor: John B. Marling, Livermore, Calif.

[73] Assignee: The United States of America as represented by the United States Department of Energy, Washington, D.C.

[21] Appl. No.: 893,233

[22] Filed: Apr. 4, 1978

[51] Int. Cl.³ .......................................... B01J 19/12
[52] U.S. Cl. ................................................ 204/158 R
[58] Field of Search ................... 204/DIG. 11, 158 R, 204/162 R

[56] References Cited

U.S. PATENT DOCUMENTS

| | | | |
|---|---|---|---|
| 3,947,335 | 3/1976 | Marling | 204/DIG. 11 |
| 3,983,020 | 9/1976 | Moore et al. | 204/158 R |
| 4,025,408 | 5/1977 | Marling | 204/DIG. 11 |
| 4,029,558 | 6/1977 | Marling | 204/158 R |
| 4,029,559 | 6/1977 | Marling | 204/158 R |
| 4,081,339 | 3/1978 | Benson | 204/158 R |
| 4,171,251 | 10/1979 | Fowler | 204/158 R |

Primary Examiner—Howard S. Williams
Attorney, Agent, or Firm—Irene S. Croft; Roger S. Gaither; James E. Denny

[57] ABSTRACT

A method for producing a deuterium enriched material by photoinduced dissociation which uses as the working material a gas phase photolytically dissociable organic carbonyl compound containing at least one hydrogen atom bonded to an atom which is adjacent to a carbonyl group and consisting of molecules wherein said hydrogen atom is present as deuterium and molecules wherein said hydrogen atom is present as another isotope of hydrogen. The organic carbonyl compound is subjected to intense infrared radiation at a preselected wavelength to selectively excite and thereby induce dissociation of the deuterium containing species to yield a deuterium enriched stable molecular product. Undissociated carbonyl compound, depleted in deuterium, is preferably redeuterated for reuse.

13 Claims, 1 Drawing Figure

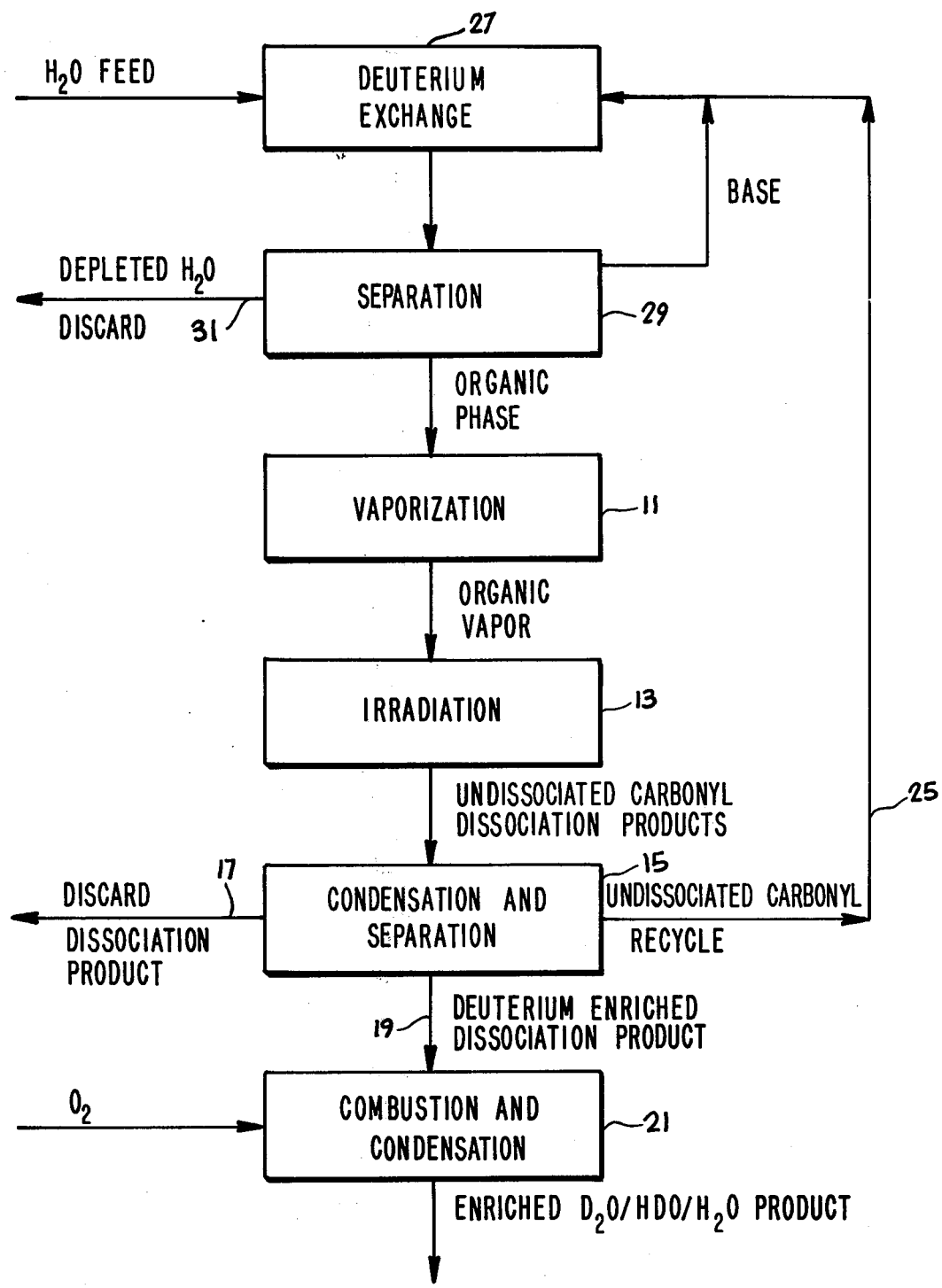

DEUTERIUM ENRICHMENT BY SELECTIVE PHOTO-INDUCED DISSOCIATION OF AN ORGANIC CARBONYL COMPOUND

The invention described herein was made at the Lawrence Livermore Laboratory in the course of or under United States Department of Energy Contract No. W-7405-ENG-48 with the University of California.

BACKGROUND OF THE INVENTION

This invention relates to a method for producing a deuterium enriched material. More particularly, this invention relates to a method for deuterium enrichment by selective photo-induced dissociation.

Deuterium is currently largely obtained from Canada. The process by which deuterium is currently produced in Canada involves deuterium exchange between water and hydrogen sulfide. The high toxicity of hydrogen sulfide and the relatively high price of the heavy water produced are disadvantages of this hydrogen sulfide technology. The need exists for a deuterium separation process which permits the production of heavy water significantly below the cost of processes currently in use and which does not involve toxic or dangerous reactants or reaction products.

Recently, various processes for deuterium enrichment based on selective photoexcitation by laser have been proposed. For example, deuterium enrichment by laser induced selective dissociation of deuterated formaldehyde or glyoxal is described in the following patents: John B. Marling, U.S. Pat. No. 3,947,335, issued Mar. 30, 1976; John B. Marling, U.S. Pat. No. 4,029,558, issued June 14, 1977; John B. Marling, U.S. Pat. No. 4,029,559, issued June 14, 1977; and C. Bradley Moore et al, U.S. Pat. No. 3,983,020, issued Sept. 28, 1976. A disadvantage of using formaldehyde or glyoxal as the working material is that these materials do not easily exchange with water and are thus not practical for large scale production of heavy water.

SUMMARY OF THE INVENTION

In accordance with the present invention, a deuterium enriched material is produced by selective photo-induced dissociation using as the working material a gas phase photolytically dissociable organic carbonyl compound containing at least one hydrogen atom bonded to an atom which is adjacent to a carbonyl group and consisting of molecules wherein the hydrogen atom is present as deuterium and molecules wherein the hydrogen atom is present as another isotope of hydrogen. The atom to which the hydrogen atom is bonded may be a carbon atom, that is, an α-carbon atom, or a non-carbon atom (a heteroatom), particularly oxygen. Thus, the organic carbonyl compound used in the present invention may be selected from compounds containing a group such as

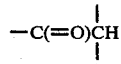

or —C(=O)OH wherein the hydrogen shown, which is the isotope source, is not directly attached to a carbonyl group but is attached to an atom adjacent to the carbonyl group. This hydrogen atom, which is the isotope source, may be considered to be an "α-hydrogen" or an "α-deuterium" since it is not attached to a carbonyl group but is attached to an atom which is in a position α to a carbonyl group. Depending upon the particular compound used, as many as six sites are available as "α-hydrogen" sites. The preferred carbonyl compounds for use in the present invention are the alkyl (which is used herein to include cycloalkyl) carbonyl compounds, particularly those of 6 or less carbon atoms since such compounds have a relatively high vapor pressure. The carbonyl compound, in the gas phase, is subjected to intense infrared radiation at a preselected wavelength to selectively excite, and thereby induce dissociation of, the deuterium containing molecules. The selectively excited molecules dissociate into a deuterium enriched stable molecular product and other decomposition products. The undissociated carbonyl compound, depleted in deuterium, is readily redeuterated for reuse by direct aqueous liquid phase H/D exchange or indirect aqueous liquid phase exchange using an alkanol in an intermediate step.

The carbonyl compounds used in the present invention unimolecularly dissociate into stable molecular products so that no scavenger gases are required. In addition, these carbonyl compounds can be redeuterated relatively simply either by aqueous liquid phase H/D exchange or by liquid phase H/D exchange with an alkanol which, in turn, is very readily redeuterated by aqueous liquid phase H/D exchange.

It is, therefore, an object of this invention to provide a method for the production of a deuterium enriched material.

More particularly, it is an object of this invention to provide a method for deuterium enrichment by selective photo-induced dissociation.

Another object of this invention is to provide a method for deuterium enrichment by selective photo-induced dissociation wherein a stable molecular deuterium enriched dissociation product is formed.

Still another object of this invention is to provide a method for deuterium enrichment wherein the deuterium depleted working material is relatively easily redeuterated for reuse.

Yet another object of this invention is to provide a method for deuterium enrichment which makes use of an infrared laser.

Other objects and advantages will become apparent from the following detailed description made with reference to the accompanying drawing.

BRIEF DESCRIPTION OF THE DRAWING

The accompanying FIGURE is a block flow diagram illustrating a particular embodiment of the present invention.

DETAILED DESCRIPTION OF THE INVENTION

Broadly, the deuterium enrichment method of the present invention utilizes as the working material as gas phase photolytically dissociable organic carbonyl compound containing at least one hydrogen atom bonded to an α-carbon atom or to a heteroatom which is adjacent to a carbonyl group and consisting of molecules wherein said hydrogen atom is present as deuterium ($^2$H) and molecules wherein said hydrogen atom is present as another isotope of hydrogen, particularly protium ($^1$H). The gas phase organic carbonyl compound is subjected to infrared radiation at a preselected wavelength and of sufficient intensity to selectively excite and induce dissociation of the deuterium containing molecules. The selectively excited molecules thereby dissociate, without substantial dissociation of the nonexcited molecules, to provide a deuterium enriched stable molecular product. The deuterium enriched product, being chemically different from the undissociated organic carbonyl compound, is readily separated from the reaction system by conventional chemical separation methods, for example, fractional condensation. In a particular embodiment of the invention, the undissociated carbonyl compound, depleted in deuterium, is redeuterated by aqueous liquid phase H/D exchange at a pH of about 4-14. In another embodiment of the invention, the depleted carbonyl compound is redeuterated by liquid phase H/D exchange with an alkanol, preferably methanol, in the presence of the corresponding alkali metal alkoxide as catalyst.

It is preferred to use an organic carbonyl compound selected from the group: $RC(=O)H$, $RC(=O)OH$, $RC(=O)R'$, $RC(=O)OR'$ wherein R and R' are independently an alkyl group of 1-5 carbon atoms, a hydroxyl-containing alkyl group of 1-5 carbon atoms, a haloalkyl group of 1-5 carbon atoms, or a carbonyl-containing alkyl group of 2-5 carbon atoms, or R and R', as defined, and the carbonyl group form a cyclic compound; with the proviso that the organic carbonyl compound contain an α-hydrogen.

Specific compounds used may be selected from the group consisting of methyl acetate; trifluoroacetic acid; acetone; 2-butanone; 3,3-dimethyl-2-butanone; cyclobutanone; 2-pentanone; 4-methyl-2-pentanone; 4,4-dimethyl-2-pentanone; 4-hydroxy-4-methyl-2-pentanone; cyclopentanone; 2,4-pentanedione; acetaldehyde; propionaldehyde; butyraldehyde; isovaleraldehyde; 3,3-dimethylbutanal; and 3-hydroxypropionaldehyde.

The above-described carbonyl compounds dissociate into stable molecular products so that no scavenger gases are required, although inert buffer gases may be used. The structure additionally permits a four or six-center transition state, which allows a low activation energy of the order of 32-45 kcal/mole for dissociation. All compounds contain the carbonyl group which permits relatively simple redeuteration of the working gas by aqueous liquid phase H/D exchange or by liquid phase H/D exchange with an alkyl alcohol which in turn is very readily redeuterated by aqueous liquid phase H/D exchange. The ability to achieve simple aqueous exchange for redeuteration of the working material is a very important requirement for an economically feasible process for production of large quantities of heavy water. Many of these compounds, in the α-deuterium species, absorb in the region from 9-11 microns, which is easily accessible by $CO_2$ laser, but are optically transparent in this same region in the corresponding $^1H$ species.

The most suitable compounds for use in the present invention are: acetone; acetaldehyde; trifluoroacetic acid; cyclobutanone; cyclopentanone; methyl acetate; 3,3-dimethyl-2-butanone; 2,4-pentanedione; and 4-methyl-2-pentanone. Spectroscopic data and dissociation products for these compounds are summarized in Table I.

TABLE I

Selected Carbonyl Containing Compounds for Multiphoton-Induced Deuterium Separation

| Name | Deuterium-Containing Species | Wavelength Range for Selective Excitation of Deuterium-Containing Species | Dissociation Products |
|---|---|---|---|
| Acetone | $CH_3C(=O)CH_2D$ | 7.8-8.0μ | $CH_3O$ + ketene ($CH_2=C=O$) |
| Acetaldehyde | $HC(=O)CH_2D$ | 8.0-8.4μ | $CH_3D$ + CO |
| Trifluoroacetic Acid | $CF_3C(=O)OD$ | 9.5-9.7μ | $CF_3D$ + $CO_2$ |
| Cyclobutanone | $\overline{CH_2CH_2C(=O)CHD}$ | 4.5-4.7μ | $H_2C=CHD$ + $H_2C=C=O$ and $C_2H_4$ + $HDC=C=O$ |
| Cyclopentanone | $\overline{CH_2CH_2CH_2C(=O)CHD}$ | 9.1-9.3μ | ketene + propylene -$d_1$ |
| Methyl acetate | $CH_3OC(=O)CH_2D$ | 10.5-10.9μ | $CH_3D$ + ethylene + $CO_2$ |
| 3,3-dimethyl-2-butanone | $(CH_3)_3CC(=O)CH_2D$ | 9.7-9.9μ | isobutene + acetaldehyde -d |
| 2,4-pentanedione | $CH_3C(=O)CHDC(=O)CH_3$ | 9.2-9.4μ | ketene + acetone -d |
| 4-methyl-2-pentanone | $CH_3CH(CH_3)CHDC(=O)CH_3$ | 9.5-9.7μ | acetone -d + propylene |

The process of the present invention is hereinafter described in greater detail with reference to the accompanying FIGURE which is a block flow diagram of a particular embodiment of the invention.

An organic carbonyl compound, as above-described, and containing an α-deuterium species in natural isotopic abundance is vaporized in vaporization chamber 11 to provide the working gas. The resulting vapor is introduced into irradiation zone 13 where it is subjected to high intensity infrared radiation by a pulsed laser at a preselected wavelength which will selectively excite the deuterium-containing species. The energy density generally required is greater than about one joule/cm² with a pulse of less than about 100 nanoseconds in duration. The selectively excited molecules thereby dissociate into a deuterium enriched material and other assorted dissociation products, without substantial dissociation of the nonexcited molecules.

The resulting mixture of undesired dissociation products, deuterium depleted undissociated carbonyl compounds, and deuterium enriched dissociation product is passed to condensation and separation chamber 15 where the individual components are separated by fractional condensation. The undesired dissociation products are removed by means of line 17 and are discarded or are recovered as a by-product. The deuterium enriched dissociation product is removed by line 19 and is passed to combustion and condensation chamber 21 where it is combusted with oxygen to produce an enriched $D_2O/HDO/H_2O$. The resulting deuterium enriched water is condensed out and removed from chamber 21 by means of line 23.

The depleted undissociated carbonyl compound is removed from condensation and separation chamber 15 by means of line 25 and, with added base to establish a pH in the range of about 4-14 is passed to deuterium exchange stage 27. In stage 27, the depleted undissociated carbonyl compound, which is in the liquid phase, is redeuterated by contact with normal water. The resulting mixture is passed to separation chamber 29 where the aqueous phase consisting of depleted water is separated and removed by means of line 31. The organic phase consisting of redeuterated carbonyl compound is passed to vaporization chamber 11 for reuse.

The following examples are illustrative of the present invention.

EXAMPLE I

Cyclopentanone, containing deuterium in natural isotopic abundance, is vaporized at a temperature of about 25° C. to provide a vapor of about 10 torr pressure. The resulting vapor is subjected to high intensity infrared radiation by a pulsed $CO_2$ laser operating on the band near $9.2 \pm 0.1$ micron at an energy density of about 10 joule/cm$^2$ and with a pulse of less than 100 nsec duration to selectively excite the α-deuterium containing species. After absorption of about 20 $CO_2$ laser photons, the selectively excited molecules dissociate into a mixture of deuterium enriched ketene (HDC=C=O) and propylene ($C_3H_5D$).

The resulting mixture of deuterium enriched material and undissociated cyclopentanone vapor is cooled to a temperature of about 0° C. to liquefy the undissociated cyclopentanone. At this temperature the ~100-fold deuterium enriched dissociation products remain gaseous and are removed for combustion to water for final enrichment to $D_2O$. The deuterium depleted cyclopentanone liquid is mixed with about twice its volume of water containing about $10^{-3}$ M sulfuric acid as catalyst for H/D exchange. After agitation for one hour at 80° C., the liquid is allowed to settle and the redeuterated cyclopentanone is removed from the upper layer. This redeuterated cyclopentanone is then recycled to begin a new cycle of deuterium separation.

EXAMPLE II

Cyclopentanone containing deuterium in natural isotopic abundance is vaporized as in Example I. The resulting vapor is subjected to high intensity infrared radiation provided by two $CO_2$ lasers, the first laser operating near $9.2 \pm 0.1$ micron and the second laser near $9.4 \pm 0.2$ micron temporally and spatially coincident with the infrared radiation from the first laser, to selectively excite the α-deuterium containing species. A deuterium enriched dissociation product is separated as in Example 1.

EXAMPLE III

Trifluoroacetic acid vapor containing deuterium in natural isotopic abundance is used as the working gas. The vapor, at a vapor pressure of about 10 torr, is subjected to intense infrared radiation provided by a $CO_2$ laser operating at a wavelength near $9.6 \pm 0.1$ micron to selectively excite the α-deuterium containing species. The selectively excited molecules dissociate into $CO_2$ and a deuterium enriched product containing $CF_3D$. The resulting mixture of deuterium enriched product, carbon dioxide, and undissociated trifluoroacetic acid vapor is cooled to a temperature of about $-30°$ C. to liquefy the undissociated material. The deuterium enriched dissociation product remains gaseous and is removed for combustion to water for final enrichment to $D_2O$.

EXAMPLE IV

Methyl acetate, containing deuterium in natural isotopic abundance, is vaporized to provide a vapor of about 10 torr pressure. The resulting vapor is subjected to intense infrared radiation by a pulsed $CO_2$ laser operating on the band near $10.7 \pm 0.2$ micron at an energy density of about 1 joule/cm$^2$ and with a pulse of less than 100 nsec duration to selectively excite the α-deuterium containing species. After absorption of about 20 $CO_2$ laser photons, the selectively excited molecules dissociate into a deuterium enriched product containing $CH_3D$. The resulting mixture of deuterium enriched product and undissociated depleted methyl acetate is cooled to a temperature of about $-60°$ C. to liquefy the undissociated methyl acetate. At this temperature the $CH_3D$ remains gaseous. The resulting deuterium enriched gaseous material is removed for combustion to water to provide $D_2O$.

The deuterium depleted liquid methyl acetate is mixed with about three times its volume of methanol containing about 1 mole/liter of sodium methoxide for about 15 minutes at about 35° C. for liquid phase H/D exchange. The resulting redeuterated methyl acetate is separated from depleted methanol by fractional distillation. The redeuterated methyl acetate is returned to the system for another cycle of deuterium separation. The depleted methanol is redeuterated by aqueous liquid phase H/D exchange, which occurs instantaneously without a catalyst, and then separated from the water by distillation.

Thus, it has been shown that the present invention provides a method for deuterium enrichment by selective photo-induced dissociation wherein a stable deuterium enriched product is produced and wherein the depleted working material is readily redeuterated for reuse, using inexhaustible supplies of water as the deuterium source.

While specific examples and a specific operational sequence for carrying out the invention have been described, modifications and changes will become apparent to those skilled in the art, and it is intended to cover in the appended claims all such modifications and changes as come within the spirit and scope of the invention.

What I claim is:

1. A method for producing a deuterium enriched material by selective photo-induced dissociation which comprises:

providing a gas phase photolytically dissociable organic carbonyl compound containing at least one hydrogen atom bonded to an atom which is adjacent to a carbonyl group and consisting of molecules wherein said hydrogen atom is present as deuterium and molecules wherein said hydrogen atom is present as another isotope of hydrogen;

subjecting the gas phase organic carbonyl compound to infrared radiation at a preselected wavelength and of sufficient intensity to selectively excite and induce dissociation of said deuterium containing molecules, thereby providing a deuterium enriched molecular dissociation product, the non-excited molecules remaining substantially undissociated; and recovering the deuterium enriched molecular dissociation product.

2. The method according to claim 1 wherein the undissociated molecules are redeuterated for reuse by liquid phase hydrogen/deuterium exchange with water at a pH in the range of about 4–14.

3. The method according to claim 1 wherein the undissociated species is redeuterated for reuse by liquid phase hydrogen/deuterium exchange with an alkyl alcohol in the presence of a sufficient amount of the corresponding alkali metal alkoxide as catalyst.

4. The method of claim 3 wherein the alkyl alcohol is methanol.

5. The method according to claim 1 wherein the organic carbonyl compound is an alkyl carbonyl compound.

6. The method according to claim 5 wherein the alkyl carbonyl compound is selected from the group consisting of RC(=O)H, RC(=O)OH, RC(=O)R', and RC(=O)OR', wherein R and R' are independently an alkyl group of 1–5 carbon atoms, a hydroxyl-containing alkyl group 1–5 carbon atoms, a haloalkyl group of 1–5 carbon atoms, or a carbonyl-containing alkyl group of 2–5 carbon atoms, or R and R' and the carbonyl group form a cyclic compound.

7. The method according to claim 6 wherein the alkyl carbonyl compound is selected from acetone; acetaldehyde; trifluoroacetic acid; cyclobutanone; cyclopentanone; methyl acetate; 3,3-dimethyl-2-butanone; 2,4-pentanedione; and 4-methyl-2-pentanone.

8. The method according to claim 5 wherein the alkyl carbonyl compound is cyclopentanone.

9. The method according to claim 8 wherein the infrared radiation is provided by an infrared laser operating at a wavelength near $9.2\pm0.1$ micron.

10. The method according to claim 9 wherein the infrared radiation is provided by two infrared lasers, the second laser operating near $9.4\pm0.2$ micron temporally and spatially coincident with the infrared radiation from said infrared laser operating near $9.2\pm0.1$ micron.

11. The method according to claim 5 wherein the alkyl carbonyl compound is trifluoroacetic acid.

12. The method according to claim 5 wherein the alkyl carbonyl compound is methyl acetate.

13. The method according to claim 12 wherein the undissociated molecules are redeuterated for reuse by liquid phase hydrogen/deuterium exchange in methanol in the presence of a sufficient amount of an alkali metal methoxide to catalyze the exchange.

* * * * *